(12) United States Patent
Saha

(10) Patent No.: US 12,505,877 B2
(45) Date of Patent: Dec. 23, 2025

(54) METHODS AND SYSTEMS TO INCREASE EFFICIENCY OF SRAM WRITE ASSIST SCHEME

(71) Applicant: Biprangshu Saha, Bangalore (IN)

(72) Inventor: Biprangshu Saha, Bangalore (IN)

( * ) Notice: Subject to any disclaimer, the term of this patent is extended or adjusted under 35 U.S.C. 154(b) by 118 days.

(21) Appl. No.: 18/208,306

(22) Filed: Jun. 11, 2023

(65) Prior Publication Data

US 2024/0412780 A1     Dec. 12, 2024

(51) Int. Cl.
| | | |
|---|---|---|
| *G11C 11/00* | (2006.01) | |
| *G11C 11/4076* | (2006.01) | |
| *G11C 11/4093* | (2006.01) | |
| *G11C 11/419* | (2006.01) | |

(52) U.S. Cl.
CPC ........ *G11C 11/419* (2013.01); *G11C 11/4076* (2013.01); *G11C 11/4093* (2013.01)

(58) Field of Classification Search
CPC ....... G11C 11/419; G11C 7/12; G11C 7/1096; G11C 5/145; G11C 11/417; G11C 11/418; G11C 11/41; G11C 11/412; G11C 11/413; G11C 16/06; G11C 16/24; G11C 16/30; G11C 5/00; G11C 7/10; G11C 7/1084; G11C 7/22; G11C 8/08; G11C 5/06; G11C 5/14; G11C 7/18; G11C 8/16; H02M 3/07
USPC .................................................. 365/189.011
See application file for complete search history.

(56) References Cited

U.S. PATENT DOCUMENTS

2020/0090736 A1 *    3/2020   Schaefer ................ G11C 5/145

* cited by examiner

*Primary Examiner* — Thong Q Le

(57) ABSTRACT

In one aspect, a method of controlling the unused coupling capacitors to boost the efficiency of write-assist scheme in SRAM compiler space, includes the steps of: deselecting the plurality of unused coupling capacitors in an SRAM compiler-generated instance; driving the drive terminal of unused and deselected coupling capacitors a high impedance and making it float; while the negative bit-line drive for write assist is performed through a plurality of selected coupling capacitors. The unused coupling capacitors with one terminal floating do not load on the negative bit-line drive process which results in the negative bit-line write assist scheme operating more efficiently to produce a higher negative bump with smaller coupling capacitors at lower power consumption as the system operates at reduced loading.

20 Claims, 6 Drawing Sheets

METHODS AND SYSTEMS TO INCREASE EFFICIENCY OF SRAM WRITE ASSIST SCHEME

BACKGROUND

1. Field

This application relates generally to Static Random Access Memory (SRAM) periphery circuit, in particular, to the Input-Output circuitry (I/O Circuit) with the write-assist feature.

2. Related Art

A SRAM is composed of SRAM bit-cell array which retains the stored data and a periphery circuitry to facilitate the write and read operation to the Bit-Cell array. To conserve power, it is generally helpful to reduce the supply voltage. However, because of the stringent bit-cell design and its requirements, supply voltage reduction is limited by some minimum voltage ($V_{min}$) below which read and write operations suffer failures. For example, write operation is achieved by discharging the bit-cell internal node through the bit-cell pass-gate; a lower supply voltage below $V_{min}$, causes the overdrive voltage to the bit-cell pass-gate to drop significantly that it cannot pull down the bit-cell internal node to the trip point anymore causing write failure. A Write Assist technique, as its name signifies, provides an extra boost to the bit-cell pass gate overdrive voltage; hence, it makes a successful write operation even at low voltage operation below $V_{min}$.

SRAM at lower technology nodes and with low supply voltages, write-assist becomes an inevitable element to make a successful write operation. The popular choice for the write-assist technique as per several articles is to create a momentary negative bit-line (NBL) drive or bump which is achieved by the capacitive coupling method. A momentary negative bit-line with a positive word line (WL) voltage results in higher overdrive voltage for the pass-gate and eventually makes a successful write operation as it pulls down the internal node to the trip point easily.

An NBL drive by capacitive coupling method mainly needs a coupling capacitor (CC) and a driver. One terminal of the CC is connected to the driver and another one (Bump) is connected to the bit-line via some devices or transistors. As the driver produces a falling transition to one of the terminal of CC, the Bump terminal of CC, which is initialized to zero potential, now makes a falling transition too from zero to a certain negative value given by $$Vnbl = -\frac{VDD * CC}{CC + Cbl + Cx} \qquad (i)$$

Where:
VDD=Supply Voltage
CC=Capacitance of the Coupling capacitor
Cbl=Capacitance of the bit-line
Cx=Any other parasitic capacitance of the Bump node.
Cbl and Cx, which appears in the denominator, act as a load to the coupling action, Where the CC being the driving one appears at both the denominator and numerator. Higher CC is required to generate a high NBL drive, while the higher bit-line load or presence of parasitic capacitance reduces the NBL drive. Eventually, for a given system with high Cx or Cbl, a higher CC is required for the given target NBL bump.

An SRAM compiler is capable of delivering different instances with different bit-line lengths hence different bit-line loads (Cbl). The amount of NBL drive on the bit-line has to be optimum-a higher drive can cause the Drain-Body diode of the bit-cell NMOS pass-gate to forward bias, and a lower drive may fail to assist the write operation. In the compiler space, the bit-line is expected to have a different length and load onto it for different delivered instances which may cause a non-optimum negative bit-line (NBL) drive if only one CC is used for all different delivered instances as given by the equation (i). Therefore, to achieve an optimum NBL drive, a number of CC are required to target different bit-line lengths in a compiler space. For a shorter bit-line which offers a smaller load, it uses a trimmer capacitor and for a longer bit-line, a greater value of the capacitor is required. For an even longer bit-line, the first two CC only can be made to act together instead of placing another CC all again. This is why SRAM compilers can employ the NBL drive system with multiple coupling capacitors (CC), which can be selected by trim pins, to target optimum write assist for a range of delivered instances with varying bit-line lengths. One node of all the coupling capacitors is tied to the node named Bump, and the other node of each of the coupling capacitors is connected to individual drivers to drive a falling transition to the individual coupling capacitors. A coupling capacitor (CC) along with its driver is identified as a CC system. Based on the given instance bit-line length, one or more CC systems are selected to receive transition and produce the NBL bump, while the CC of the unused CC systems is unselected and held at static "high." Eventually, there are unselected or unused coupling capacitors on the bump node that appears as a parasitic capacitive load (Cx) to the coupling action with the other terminal effectively tied to the VDD by the driver system. In short, one or more selected CC systems to act as the driving one for the NBL drive and contribute to the Numerator of equation (i), while the other unused capacitors contribute to the denominator Cx as a load to the equation (i). As suggested by the equation as the load capacitance increases, the NBL bump decreases, hence, the driving CC capacitor can be bigger in size and capacitance to generate the target NBL bump, and eventually the higher CC and load drains more toggling dynamic power.

Existing implementations employ several semiconductor devices to achieve write-assist in periphery I/O circuitry as shown in FIG. 5 (prior art), as described in Pub. No.: US 2015/0206576A1. A write-assist comes with a write operation, therefore the active part write-cycle with write-assist can be divided into two major phases bit-line discharge phase and the write-assist phase. In the bit-line discharge phase, bit-line discharge through write driver 510 is achieved as Wa_trig toggles low to high turning ON the NMOS transistor 513 at the onset of the write operation. As the bit-line discharges close to zero level, it is the onset of the write-assist phase and time to trigger the NBL drive on the bit-line through capacitive coupling. The signal from the control, Wa_trig toggles from high to low at the time to trigger write assist when the bit-line discharges close to logic low. It turns OFF the NMOS 513 and makes the bit-line floating or high impedance which serves as the prerequisite for the coupling action to take place. The signal Wa_trig high-to-low transition makes a high-to-low transition on the net either 518 or 520 or both through the NOR and INVERTER logic gates, which eventually couples to the bit-line through the coupling capacitors (C1 or C2 or Both)

and develops a negative bump on the bit-line. The system is demonstrated for 2-bit trim with two coupling capacitors. However, an SRAM compiler can employ a number of coupling capacitors (CC) and corresponding trim bits based on the range of the compiler. For the trim input Wa<1: 0>=<0,1> or <1,0>, only one net either 518 or 520 toggle hence, only one capacitor (c1 or c2) plays an active role to generate the NBL bump, and the other one hangs on to the bump node while it's another terminal tied to VDD through the inverter, eventually plays no role in bump creation but acts as a load.

Since Integrated circuits (IC) are evolving to deliver more computation power, the requirements of several on-chip SRAMs along with their activity factor are growing exponentially. This trend demands a close check on the power and area consumption of the SRAM instances. However, in the prior art, to facilitate the SRAM compiler, it employs multiple couplings capacitors, out of which one set of CC for a given SRAM instance does not play any active role to the NBL drive but consumes area and power by appearing as a load on the NBL operation. Therefore, it is very inefficient. Thus, it is of great importance to provide a solution by which the unused elements can be isolated and restricted to act as a load.

SUMMARY OF THE INVENTION

In one aspect, a method of controlling the unused coupling capacitors to boost the efficiency of the write-assist scheme in SRAM compiler space includes the steps of deselecting the plurality of unused coupling capacitors in an SRAM compiler-generated instance; driving the drive terminal of unused and deselected coupling capacitors a high impedance and making it float; while the negative bit-line drive for write assist is performed through a plurality of selected coupling capacitors. The unused coupling capacitors with one terminal floating do not load on the negative bit-line drive process which results in the negative bit-line write assist scheme operating more efficiently to produce a higher negative bump with smaller coupling capacitors at lower power consumption as the system operates at reduced loading.

Figure 1:
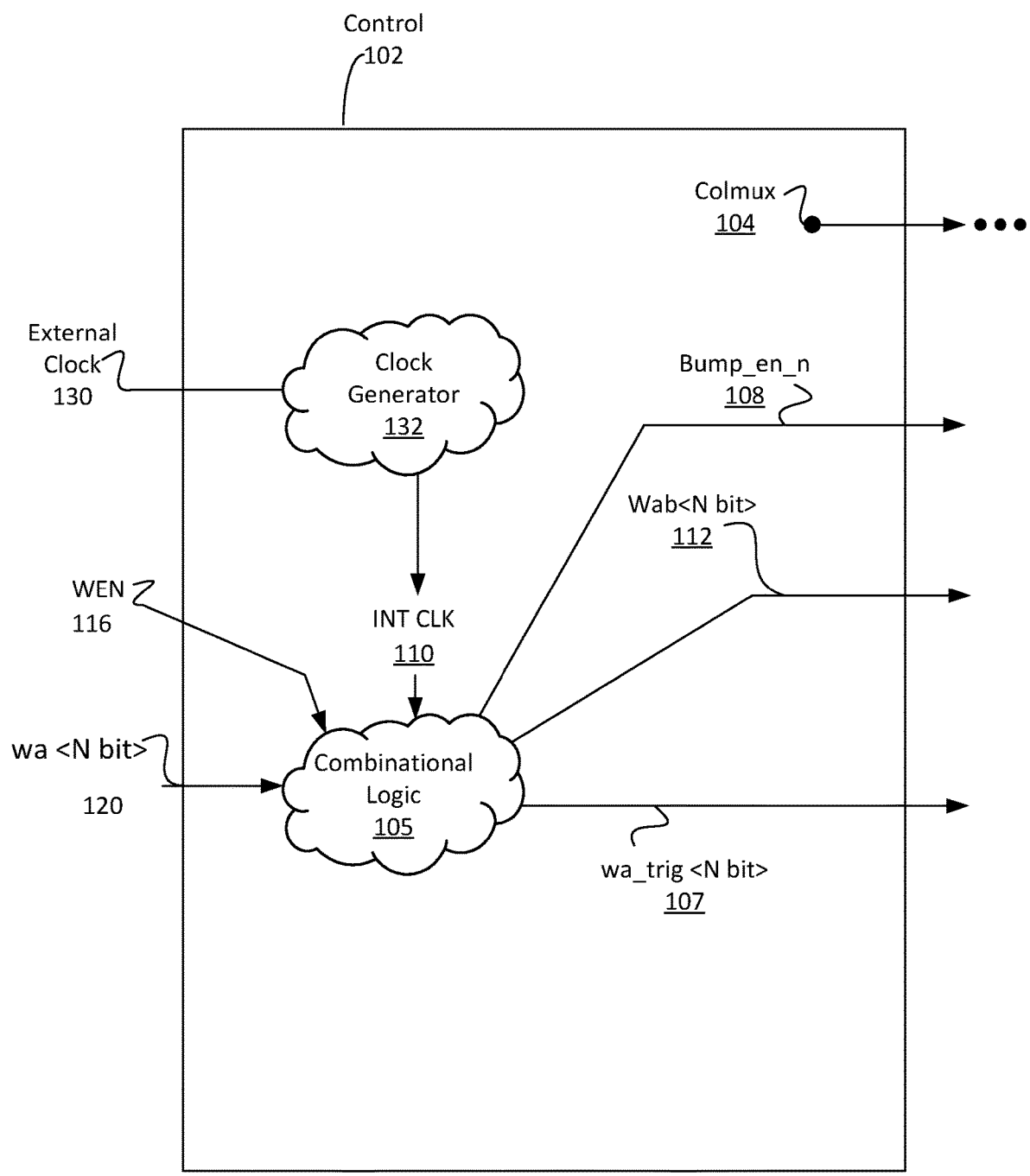
FIG. 1 illustrates an example control circuit, according to some embodiments.

The Figures described above are a representative set and are not an exhaustive with respect to embodying the invention.

DESCRIPTION

Disclosed are a system, method, and article of manufacture for utilizing static random-access memory with the write-assist feature. The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to 'one embodiment,' 'an embodiment,' 'one example,' or similar language means that a particular feature, structure, or characteristic described in connection with the embodiment is included in at least one embodiment of the present invention. Thus, appearances of the phrases 'in one embodiment,' 'in an embodiment,' and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Definitions

Example definitions for some embodiments are now provided.

Bit-cell can be part of an integrated circuit (and/or another storage medium) in which a single bit is recorded.

N-type metal-oxide-semiconductor logic uses n-type (-) MOSFETs (metal-oxide-semiconductor field-effect transistors) (NMOS) to implement logic gates and other digital circuits. NMOS transistors operate by creating an inversion layer in a p-type transistor body. This inversion layer called the n-channel, can conduct electrons between n-type "source" and "drain" terminals. The n-channel is created by applying a voltage to the third terminal, called the gate.

NMOS transistors have four modes of operation: cut-off (and/or subthreshold), triode, saturation (e.g. active), and velocity saturation.

P-type metal-oxide-semiconductor logic uses p-type (-) MOSFETs (metal-oxide-semiconductor field-effect transistors) (PMOS) to implement logic gates and other digital circuits. PMOS transistors operate by creating an inversion layer in an n-type transistor body. This inversion layer, called the p-channel, can conduct electrons between p-type "source" and "drain" terminals. The p-channel is created by applying a voltage to the third terminal, called the gate. PMOS transistors have four modes of operation: cut-off (and/or subthreshold), triode, saturation (e.g. active), and velocity saturation.

Static random-access memory (SRAM) can be a type of semiconductor memory that uses bistable latching circuitry to store each bit. SRAM can be semiconductor memory device that implements a random-access memory-based storage that holds data in a static form. SRAM can retain data while the memory device has power.

NBL (Negative Bit-Line) drive is a popular technique of SRAM write assist. In this scheme, during SRAM write operation, one of the bit lines pulsed to a slightly negative voltage rather than just a zero potential, while the complementary bit-line is maintained at a high logic. The negative voltage on the bit-line results in higher overdrive voltage for the SRAM bit-cell's pass gate transistor, which finally accelerates the write operation.

Example Computer Architecture and Systems

FIG. 1 illustrates an example of a control circuit 102, according to some embodiments. Control circuit 102 can be the whole control circuit for an SRAM system.

Colmux 104 provides an address-decoded signal as select lines for the multiplexer that multiplexes a number of bit-cell columns to the I/O circuit.

Input 120 is now described. Input 120 is represented as an N-bit wide input pin Wa<N bit>. Input 120 can be a configuration pin or a trim pin. Input 120 receives the information from an external source as to whether to turn on or turn off a write assist operation. All logic low on the N-bit signal represents a no-assist case whereas any one bit being logic high turns it to be a write-assist case. When the input is to turn on the write-assist, then the level of the applied write-assist is also defined by the signal 120 itself. The level of the write assist is defined as the amount of NBL bump or drive on the bit-line: the greater the NBL bump greater the level and the higher the assist. The input value of 120 can be used to produce different NBL bump levels or target different bit-line loads. The higher the value on Wa<N bit> 120, the higher the bit-line load it can target to apply write-assist for. In an SRAM compiler space to accommodate a range of instances with different bit-line lengths and load the requirement of trim signal Wa<N bit> is inevitable. If the value on signal Wa<N bit> is a decimal zero, then the write assist is turned off. As the value on the signal Wa<N bit> increases, the write-assist level also increases. The amount of increase of the negative bump is defined by input 120. Based on the value of Wa<N bit> signal control logic generates a number of control signals that eventually activate the respective coupling capacitor (CC) systems to produce the required level of NBL Bump.

WEN 116 is also an input pin. WEN 116 is to indicate wherein a write cycle or read cycle is intended for. Here WEN 116 stands for an active-low write enable signal. Being an active-low signal, if the WEN 116 signal is logic low, it indicates to controller 102 that there is a write cycle to take place at the following External clock 130 rising edge.

In the context of the write-assist operation, controller 102 can use a logic low on WEN 116 as a prerequisite for the write-assist operation, out of the fact that write assist is required only in the write cycle. Therefore, a logic low at WEN 116 serves as the primary criteria for activation of all write-assist related control signals.

INT CLK 110 is an internal clock or Global Timing Path (GTP). INT CLK 110 is an internally generated clock from the external clock 130 input.

Figure 4:
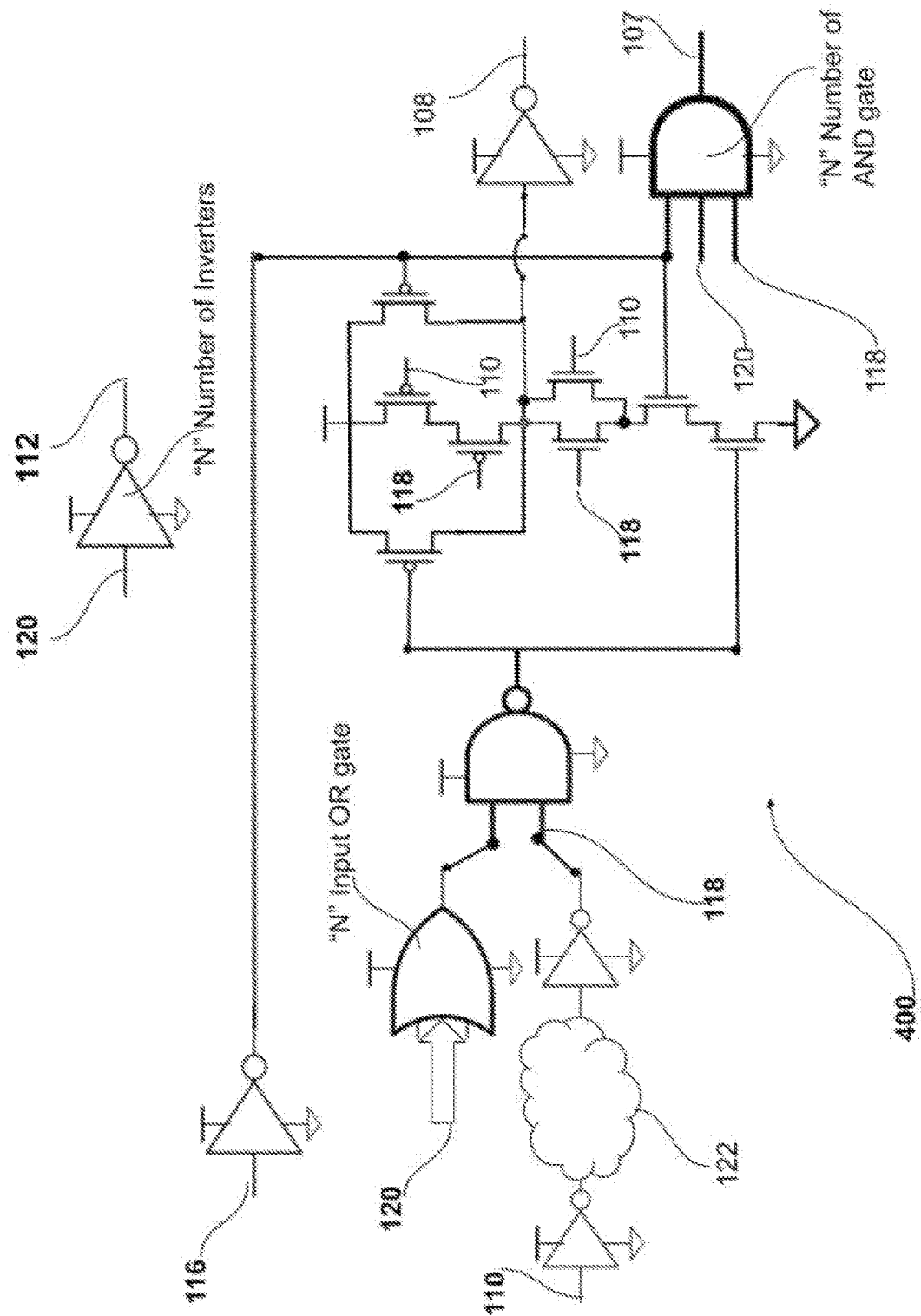
FIG. 4 represents an example circuit implementation of the combinational control logic of FIG. 1, according to some embodiments.
Figure 5:
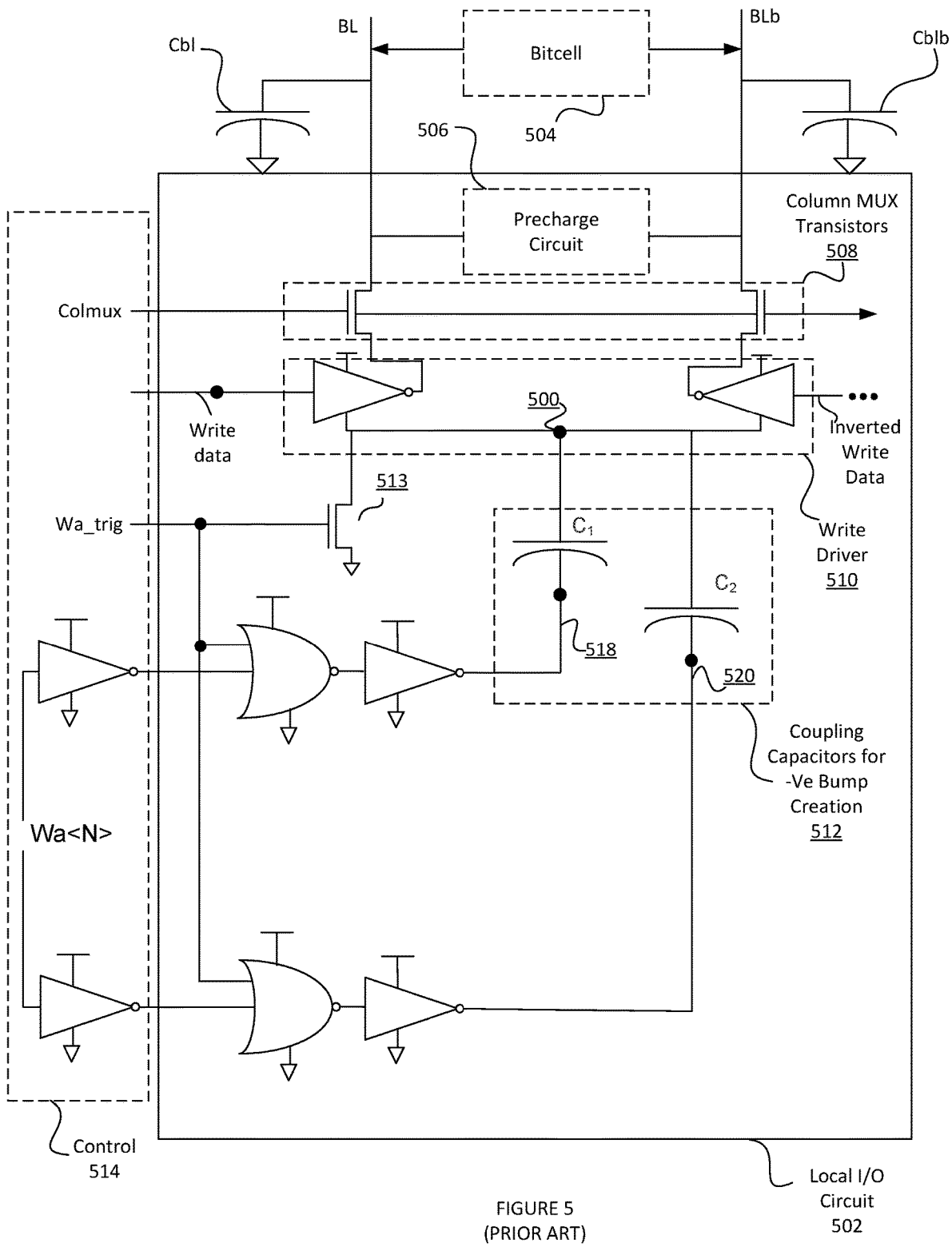
FIG. 5 (prior art) shows an example prior art circuit upon which the present invention improves.

Combinational control logic 105 receives the input (e.g., 116, 110, 120). Combinational control logic 105 generates control signals Bump_en_n 108, Wa_trig<N bit> 107, Wab<N bit> 112. An example combinational control logic implementation is shown in FIG. 4. Combinational control logic 105 plays an important role as it provides the necessary control signals for the scheme.

Figure 2:
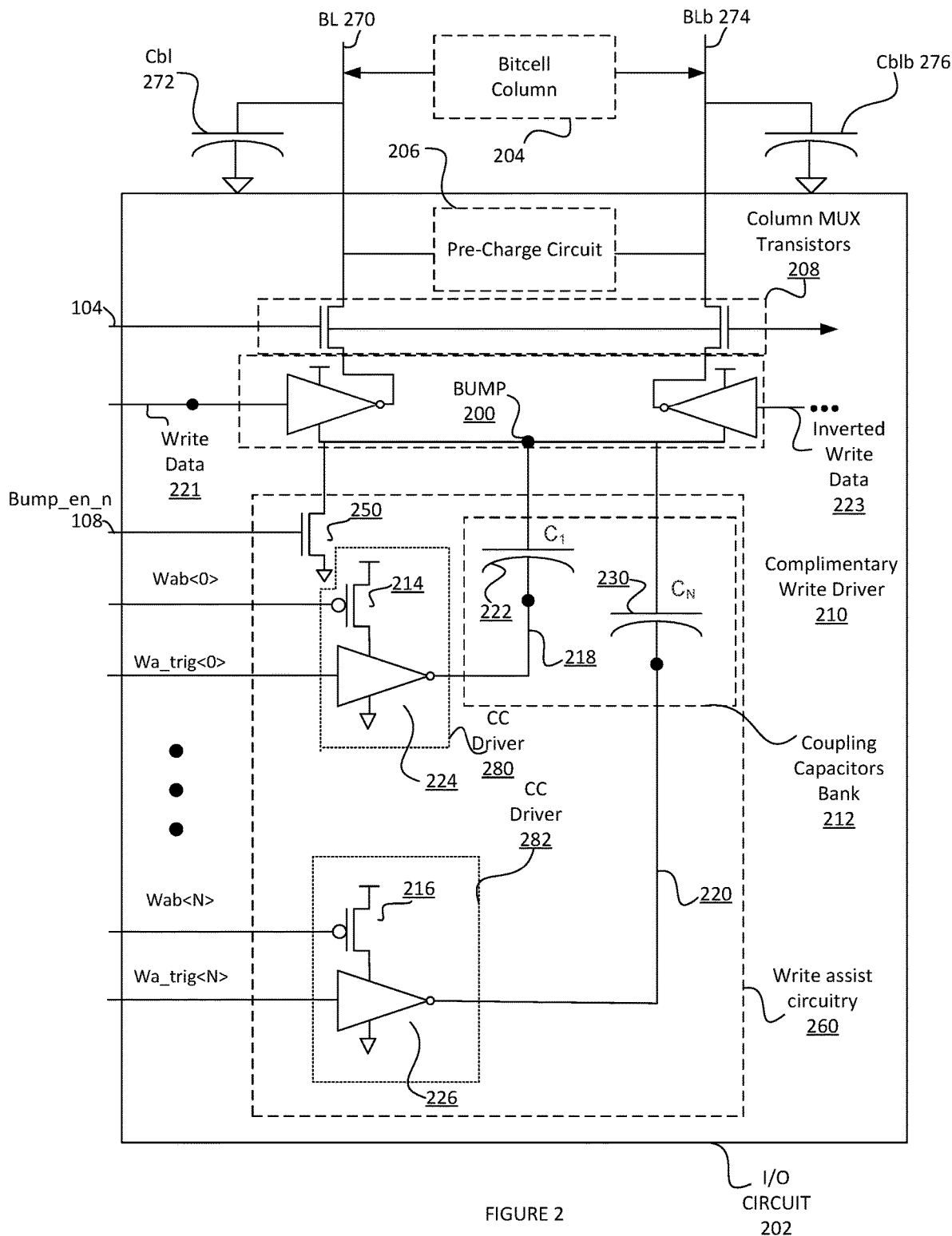
FIG. 2 illustrates an example I/O circuit, according to some embodiments.

Bump_en_n 108 is now defined. The signal Bump_en_n 108 represents an active low signal that enables the NBL bump generation when the level is logic low. It is noted that the write driver ground terminal, which is the bump generation node (BUMP 200 in FIG. 2 infra) as well, is located on the NBL bump propagation path as shown in FIG. 2. In the bit-line discharge phase, the write driver can drive the logic low to the bit-line, hence, it uses the circuit ground connection. However, at the write-assist phase, the bump node which is initialized at logic low at the bit-line discharge phase now can be high impedance for the NBL action to take place. Therefore the write driver ground terminal can be connected to the circuit ground during the bit-line discharge phase and can be disconnected at the onset of the write-assist phase. This signal Bump_en_n serves a dual purpose; First toggles from logic low to high at the onset of the write cycle and turns the NMOS 250 in FIG. 2 ON, so that the write driver's ground connection is connected to circuit ground. Secondly At the onset of the write-assist phase, Bump_en_n 108 toggles from logic high to low and turns off the NMOS 250 in FIG. 2 disconnecting the bump node 200 from the circuit ground. When the NMSO 250 is turned off a high impedance state appears on the bump node 200 which is required for the NBL bump to take place on the node Bump 200 by the capacitive coupling action. In a no-assist write cycle case, the signal Bump_en_n transits logic high at the onset of the write cycle, maintains logic high for the entire write cycle and then toggles back to low after the word line falling transition.

Control signal Wa_trig<N bit> 107 is now discussed. The signal Wa_trig represents an N-bit write-assist-trigger signal. While Bump_en_n 108 makes the Bump node high impedance to facilitate the NBL to take place, Wa_trig<N bit> plays an important role of triggering the NBL bump by applying transition to the Coupling capacitors (CC) system. In an example case, control signals Wa_trig<N bit> bits are normally at zero level; at the event of the NBL bump trigger, a low to high transition on this N-bit control signal Wa_trig<N bit> creates a negative bump on the node Bump 200 in FIG. 2 through the CC systems. This signal is generated by control logic 105 located at control circuit 102 in FIG. 1. Each of the N-numbers of the CC system is driven by a respective Wa_trig<N bit> signal bit. While for the selected CC system the control logic 105 drives Wa_trig<N bit> signal bit from low to high, for the unused CC system the Wa_trig<N bit> signal bit does not toggle and maintains its initial logic low throughout the write cycle.

The control signal Wab<N bit> 112 is defined as another control signal that is generated by control logic 105 and travels to the I/O circuits 202 of FIG. 2, to control the unused coupling capacitors (CC). Based on Wa<N>, the invention implements Wab<N bit> 112 signal to drive a static low to the selected CC systems and a static high to the unused CC systems.

FIG. 2 illustrates an example bit-cell column 204 on which I/O circuit 202 operates, according to some embodiments. It is noted that in the SRAM bit-cell array, there could be multiple bit-cell columns. An I/O circuitry can be connected to multiple bit-cell columns based on the mux value of the given SRAM instance. For the simplicity of demonstration, only one bit-cell column 204 has been portrayed in FIG. 2. Read and Write operations on a bit-cell in bit-cell column 204 are managed by systems 105 and 102 of FIG. 1 and FIG. 2, respectively. As shown, bit-cell column 204 has two complementary bit-lines, bit-line (BL) 270 and bit-line complement (BLb) 274 and it connects to all the bit-cells on the given bit-cell column 204. The capacitive loads on the bit-line are represented as Cbl 272 and Cblb 276. It is noted that Cbl 272 may be matched and nearly equal to Cblb 276. As different SRAM compiler-delivered instances may have different bit-line lengths the Cbl and Cblb of one instance differ from another instance's Cbl and Cblb. Based on which of the complementary bit-lines (e.g. BL or BLb) transits to logic low during a write-cycle, the corresponding capacitor (Cbl or Cblb respectively) appears as the Cbl of equation (i).

FIG. 2 demonstrates one of the most important elements of the SRAM I/O circuit 202. For example, I/O circuit 202 is responsible for performing several operations like pre-charge, write, read etc., on the bit-cell column 204. The I/O 202 circuit consists of pre-charge circuit 206, column mux transistors 208, complementary write driver 210, write-assist circuitry 260 and read circuitry. Read circuitry is out of scope in the context of the invention under discussion. Each I/O circuit serves one SRAM data bit. Therefore, the I/O 202 circuit instantiation is repeated the number of times given by the number of bits of the SRAM data bus.

SRAM operation involves pre-charging the bit-lines 270 and 274 through pre-charge circuit 206 located at the I/O circuit.

Column MUX transistor(s) 208 connects a particular bit-cell column out of many to the respective I/O circuit 202. Column MUX transistor 208 is controlled by the signal Colmux 104.

I/O circuit 202 receives the data bit to be written to a bit-cell in the SRAM bit-cell column 204. The input data is converted to complementary write data 221 and 223 and fed to write drivers.

The write driver 210 is the main responsible element for driving a complementary signal on the bit-line to make a successful write operation. The write driver 210 receives the complementary data and drives the bit lines 270 and 274 of the bit cell column 204 via column mux transistors 208. As the bit lines 270 and 274 are already pre-charged to logic high, the complementary write driver pulls down one of the bit-lines to logic low and maintains the logic high to the other one (e.g. based on the input data bit polarity).

The node Bump 200 is hereby defined. It is noted that node Bump 200 is the ground connection of the write driver as well as the common terminals of all the coupling capacitors (CC). As given in the circuit this net 200 can be driven to ground (e.g. zero potential) or can be left floating (e.g. high impedance) by operating the connected NMOS transistor 250. A write operation with write-assist has two phases: the bit-line discharge phase and the write-assist phase. One of the driver outputs of the complementary write driver 210 can drive a logic low at the bit-line discharge phase. This can be achieved as net 200 is driven to zero potential by the NMOS transistor 250 controlled by the signal Bump_en_n (108 in FIG. 1). The same node Bump 200 goes to high impedance when the system enters into the write-assist phase after the bit-line discharge phase as the NMOS 250 is turned off. A floating or high-impedance state on Bump node 200 is required to facilitate capacitive coupling action to take place by the write-assist circuitry, otherwise, the coupling action cannot produce the NBL at node bump if it is tied to circuit ground. Being one of the terminals of the CC, the Bump node 200 is the one where the initial NBL drive is developed which further propagates to bit-lines through write-drivers and column mux transistors.

The coupling capacitors bank 212 consists of an N-number of coupling capacitors (CC) (e.g. 222, 230 and so on). As the name signifies, a coupling capacitor produces a capacitive coupling effect for the NBL drive. The NBL drive are produced by one or more CC based on Wa<N bit> signal. Therefore, one terminal of all the CC is tied together at the Bump node 200. Upon receiving a falling transition to one terminal of one or more CC, while the Bump node 200 is at high impedance and initialized to zero by the previous bit-line discharge phase, the number of coupling capacitors (e.g. individually or together) develops the NBL drive at node BUMP 200. While one or more CC are selected from the capacitor bank 212 for the NBL scheme, several CCs are left unused and appear as the load on the NBL drive action. As described in the following section, the invention uses a novel technique to manage the unused CC to prevent it from appearing as a load.

CC drivers 280 to 282 are defined now. CC drivers 280 to 282 can be one to N-number of CC drivers. The CC driver stands for coupling capacitor's driver which is responsible for driving the required signal to the CC either to trigger the NBL bump or to isolate the coupling capacitor (CC) from the NBL operation. Each driver is controlled by each set of signals Wab<N bit> and Wa_trig<N bit> (respectively 112 and 107 of FIG. 1). Eventually, The N-number of CC drivers drives the N-number of CC independently. A CC driver along with the connected CC is referred to as a CC system in the disclosure. The CC drivers consist of an inverter and a PMOS switch as described in the following section.

The N-number of inverters is shown in FIG. 2 as a zeroth inverter 224 to an $n^{th}$ inverter 226. Inverters 224-266 play a vital role in the invention under discussion. The CC systems in I/O circuit 202 receive the N bit control signal Wa_trig<N bit> which directly connects to the N-number of inverter 224 to 226 input, respectively. Upon receiving a rising transition via Wa_trig<N bit> signal, one or more inverters drive a falling transition to the CC required for NBL operation. A signal bit of Wa_trig<N bit> carries a rising transition to the respective CC system only if it is selected to generate an NBL bump. Eventually, the Wa_trig<N bit> signal bit for the unused CC system stays at logic low which drives the connected inverter (e.g. either or both of 224 and 226) NMOS transistor OFF and the PMOS transistor to turn ON.

For the unused CC, the PMOS of the respective inverter (e.g. 224, 226) drives a logic high to the CC. However, the invention prevents the turned-on PMOS to drive high to the respective unused coupling capacitor (CC) and drives a high impedance to the CC terminal instead. To achieve a high impedance at output of the inverter, whose input terminal is at logic low, another PMOS is connected to the inverter as a power gating switch. A power-gating PMOS (e.g. 214, 216) switch is connected to each inverter. Therefore N-number PMOS switches are required for the system consisting of N-number of coupling capacitors (CC). Each PMOS switch is controlled by the respective signal bit of Wab<N>. The Wa_trig<N bit> 107 signal drives a rising transition to the selected and static low transition to the unused or unselected CC system. The Wab<N bit> drives logic low to the PMOS switch (e.g. 214-216) for the selected CC system, which enables the inverter (e.g. 224-266 onwards) to produces a falling transition at the output, however, Wab<N bit> drives a logic high to the PMOS switch (e.g. 214-216) gate terminal for the unused CC system which turns the power off to the corresponding inverter-hence, a high impedance at the inverter output appears.

A capacitor acts as a load when one of its terminals is connected to the node of interest with another terminal driven directly or indirectly to the ground or power supply. In this situation, the load capacitor charges or discharges with any activity on the given node of interest. Any charging or discharging of the load capacitor demands direct current flow through it, hence power consumption. However, if there is a high impedance in the current flow path the capacitor cannot charge or discharge with the toggling activity at the node of interest and it cannot act as a load. This can be achieved simply by disconnecting the other terminal from the supply or ground. However, if the circuit uses the capacitor to be connected in some cases, the only option left is driving the capacitor terminal with a switch which can be used to connect or disconnect the capacitor from the circuit supply or ground. The same concept has been used in this invention to make the NBL write-assist an efficient one.

The invention implements a method and systems wherein the PMOS switch (e.g. 214, 216) enables the inverters (e.g. 224, 226) to drive a high impedance to the coupling capacitor (CC), while not in use, and left floating instead of driven. This results in a much more efficient NBL write-assist where target NBL bump can be achieved at lower power consumption and area utilized as smaller coupling capacitors are required to drive the NBL under reduced loading.

Figure 3:
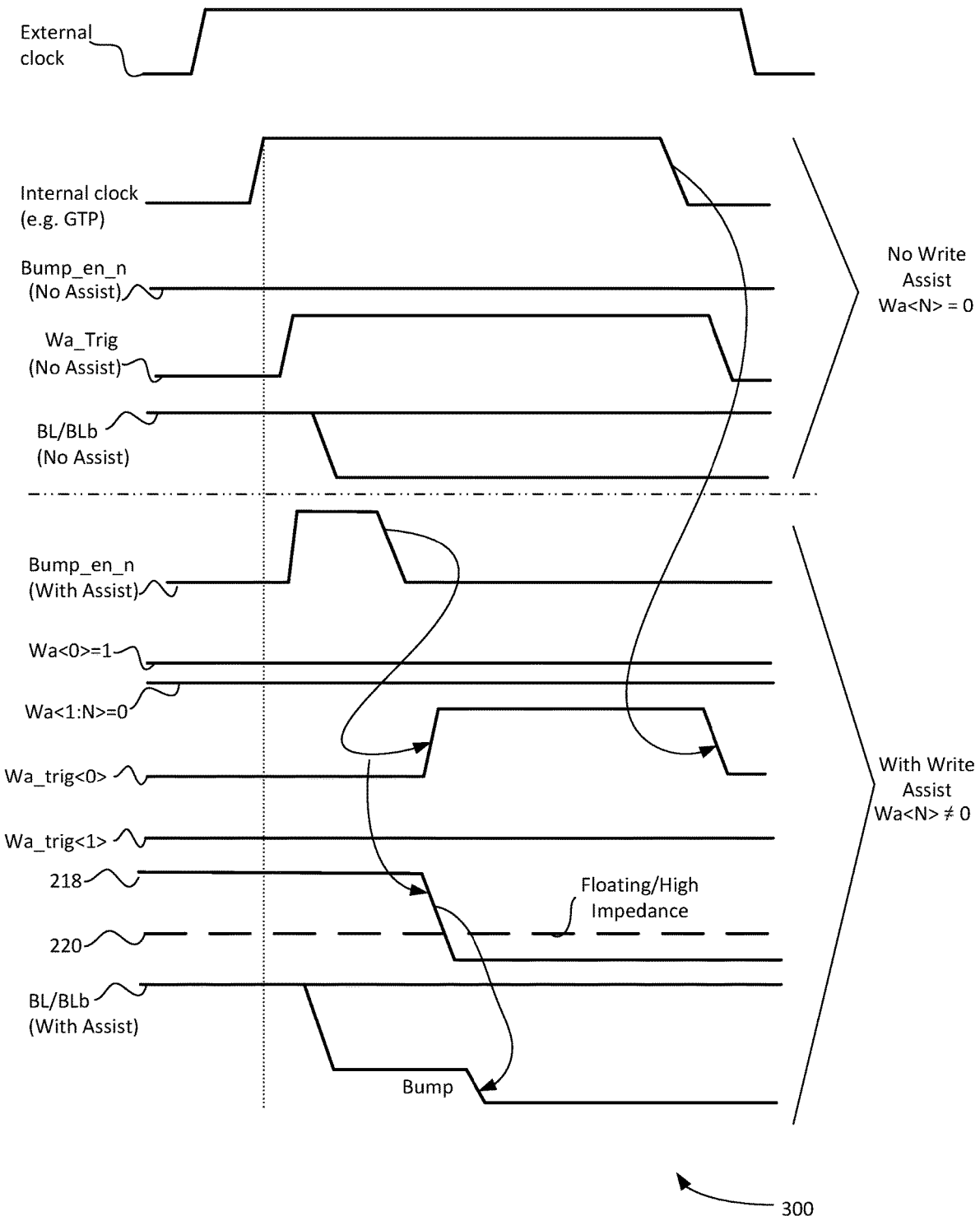
FIG. 3 represents the timing diagram and control signal generation, according to some embodiments.

FIG. 3 represents the timing diagram of different important signals, according to some embodiments. Various example waveforms of the signals discussed herein are shown. For example, waveforms are shown with no write-assist and with write-assist. It is noted from the timing diagram for the write-assist case that inverter output signal (s) 218-220 for the unused CC goes to a high impedance. It is also noted that the two phases of the write-assist are in the timing diagram, as well.

FIG. 4 represents an example circuit implementation of the combinational control logic 105 of FIG. 1, according to some embodiments. Different circuit implementations are possible for the same logic. The logic is now explained. As noted supra, the internal clock (e.g. signal GTP) 110 (of clock generator 132) is also shown here and named GTP (Global Timing Path) to indicate its importance to provide global timing. The signal GTP along with a delayed version of GTP is used to generate timing for Bump_en_n and Wa_trig<N bit> 108 and 107 of FIG. 1, respectively. The delay chain for the delayed GTP is tuned to indicate the onset of the write-assist phase.

For a write cycle which is defined by logic low at WEN, Bump_en_n 108 uses a rising transition at the start of the write cycle, a GTP rising can be used to generate the rising transition for Bump_en_n. The signal Bump_en_n 108 for no-assist can transit back to low at the end of the write cycle after the word line (WL) falls; the delayed GTP signal can be used to generate the falling transition. Hence, CMOS circuit that logically "OR" the GTP and GTPD is used for Bump_en_n 108 generation. The logic also uses a logical "AND" with an invert of WEN as the Bump_en_n transitions are required only for the write cycle. Secondly, the Bump_en_n can use a falling transition somewhere in the middle of the write cycle at the onset of write-assist for a write-assist case. To detect the write assist case N input OR gate is used to logically "OR" the N bit Wa<N bit> 120 signal. While the falling transition of the delayed signal GTPD serves Bump_en_n 108 falling transition for no assist case, GTPD rising transition can be tuned to occur at the onset of the write-assist phase-hence, it is used to generate Bump_en_n 108 fall at the onset of write-assist phase for write-assist enable case. Finally, the CMOS circuit implements the below logical expression used for Bump_en_n 108 given by Bump_en_n=($\overline{Wa}$ OR·GTPD)·(GTP+GTPD)·$\overline{WEN}$ Wa_OR=Is the N bit "OR" of all Wa<N bit> signal bits
GTP=Internal Clock signal
GTPD=Delayed GTP signal
WEN=Write Enable signal.
·=Represents logical AND
+=Represents Logical OR
_=Underline represents logical NOT The N-bit signal Wa_trig<N bit> 107 along with Wab<N bit> 112 controls the respective coupling capacitor system in every I/O circuit. Wa_trig<N bit> 107 which is initially at logic low does a rising transition at the onset of the write-assist phase and can reset to logic low at the end of the write cycle-hence, delayed GTP can be used for this purpose. Secondly, it behaves differently for unused CC systems therefore Wa<N bit> 120 signal bit also can be included in the logic as Wa<N bit> is the signal which distinguishes the selected and unselected CC systems. Finally, the activity of Wa_trig<N bit> 107 is limited to only for the write cycle-hence, WEN also comes to the logic. Given the above requirements, the circuit implements the following logic—

Wa_trig<Nth Bit>=Wa<Nth Bit>·GTPD·$\overline{WEN}$

·=Represents logical "AND"
+=Represents Logical "OR"
_=Underline represents logical "NOT"

The CMOS circuit that implements the above logic can be repeated for N-number, to generate N-number of Wa_trig signal.

Wab<N bit> 112 connects and controls the PMOS (e.g. 214, 216 of FIG. 2) gate terminal hence, it needs to be active "low" in nature. Therefore, it is the inverted signal of the input Wa<N bit> 120. Hence, it is simply generated by inverting each bit of Wa<N bit> using the N-number of CMOS inverters.

Figure 6:
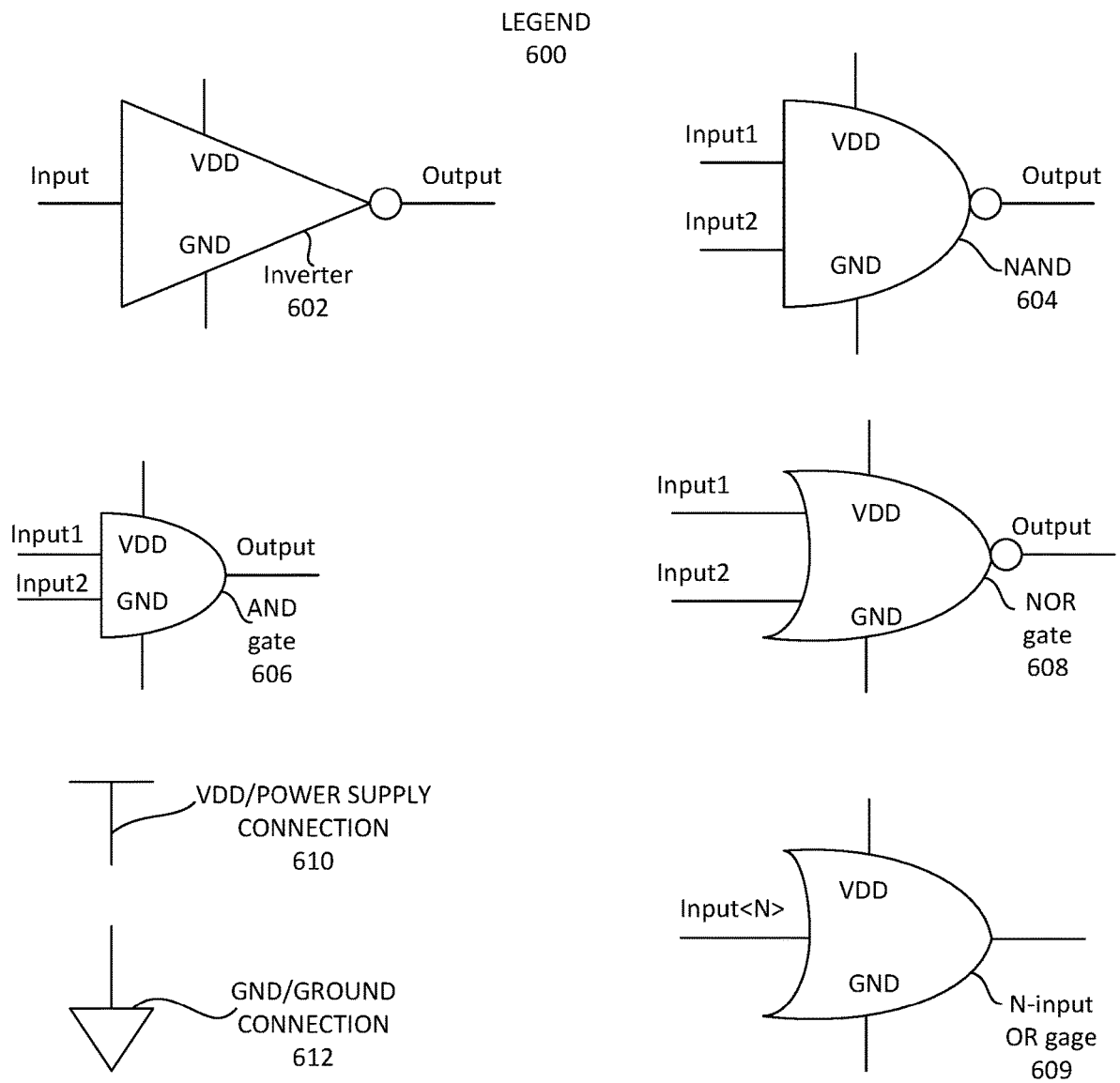
FIG. 6 illustrates examples of logic gates and other references that can be utilized herein, according to some embodiments.

FIG. 6 illustrates examples of logic gates 602-609 and other references 610-612 that can be utilized herein, according to some embodiments.

In one example, a process of controlling the unused coupling capacitors to boost the efficiency of the NBL (Negative Bit-line) drive write-assist scheme in SRAM compiler space is provided, according to some embodiments. The process deselects the plurality of unused coupling capacitors in an SRAM compiler-generated instance. The process drives the drive terminal of unused and deselected coupling capacitors to a "high impedance" state and makes it float. The process, while the negative bit-line drive for write assist is performed through a plurality of selected coupling capacitors, the unused coupling capacitors with one terminal floating do not load on the negative bit-line drive process, resulting in the negative bit-line write assist scheme operating more efficiently to produce a higher negative bump with smaller coupling capacitors at lower power consumption.

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be embodied in a machine-readable medium and/or a machine-accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transistor form of machine-readable medium.

What is claimed as new and desired to be protected by Letters Patent of the United States is:

1. A method of controlling the unused coupling capacitors to boost the efficiency of the NBL (Negative Bit-line) drive write-assist scheme in SRAM compiler space, comprising:
   a. deselecting the plurality of unused coupling capacitors in an SRAM compiler-generated instance, wherein the unused coupling capacitors with one terminal floating do not load on the negative bit-line drive process;
   b. driving the drive terminal of unused and deselected coupling capacitors to a "high impedance" state and makes it float;
   c. while the negative bit-line drive for write assist is performed through a plurality of selected coupling capacitors;
   d. wherein the unused coupling capacitors with one terminal floating do not load on the negative bit-line drive process, resulting in the negative bit-line write assist scheme operating more efficiently to produce a higher negative bump with smaller coupling capacitors at lower power consumption; and
   e. making it float by utilizing a PMOS transistor as a power gating switch that disconnects unused capacitors from a power supply.

2. The method in claim 1 further comprising a control circuit located at the SRAM instance central control unit.

3. The method of claim 2 further comprising the step of receiving a WEN-write Enable signal, an Internal clock ("GTP") signal, and an N-bit wide WA<N Bit>-write-assist trim signal as an input.

4. The method of claim 2, wherein the control circuit generates a plurality of control signals that control the systems and method disclosed under the invention.

5. The method of claim 4, wherein the plurality of control signals comprises Bump_en_n signal, an N-bit wide Wa_trig<N bit> signal, an N-bit wide Wab<N bit>, connected to each I/O circuit to control write assist scheme.

6. The method of claim 2, wherein the control signal Bump_en_n carries timing information and transits low to high at the onset of the write cycle and then high to low at the onset of the write assist phase, while for the write cycle with no write assist the high to low transition occurs at the end of the write cycle.

7. The method of claim 2, wherein the GTP along with a delayed version of GTP is used to generate timing for Bump_en_n and Wa_trig<N bit>.

8. The method of claim 7, wherein a delay chain for the delayed GTP is tuned to indicate the onset of the write assist phase.

9. The method of claim 2, further comprising a CMOS circuit wherein GTP is logical "OR" with GTPD and then logically "AND" with a logical "NOT" of WEN to generate timed transitions for Bump_en_n for no write assist case.

10. The method of claim 9, wherein is further logically "AND" ed with logical "NAND" output of delayed GTP and logical "OR" of N bit Wa<N bit> to generate a timed Bump_en_n, which can serve both assist and no assist case defined by WA<N bit>.

11. The method of claim 5, wherein each signal bit of the N bit Wa_trig<N Bit> connects and controls the respective coupling capacitor system in every I/O circuit.

12. The method of claim 2, further comprising a CMOS circuit wherein each bit of Wa_trig<N bit> is generated by logically "AND" of the delayed GTP signal, WEN, and respective Wa<N bit> signal to deliver the timed rising transition to the selected coupling capacitor system or static logic "low" for the selected and unselected, respectively.

13. The method of claim 2, wherein the control signal WAB<N Bit>, which is derived by inverting the Wa<N bit> signal, is an active low signal that drives a logic "low" to the selected and logic "high" to the deselected coupling capacitors systems.

14. The method in claim 1 further comprising a plurality of coupling capacitor driver systems, which further comprises an Inverter and a switch, connected to each coupling capacitor in every I/O circuit.

15. The method of claim 14, wherein the driver can be a CMOS inverter and the switch can be a PMOS switch.

16. The method of claim 15, wherein the PMOS switch is connected as a power gating switch for the inverter in the associated driver system.

17. The method of claim 16, wherein each of the plurality of PMOS switch GATE terminal is operated by the respective Wab<N bit> signal bit.

18. The method of claim 15, wherein each driver system inverter input is operated by the respective Wa_trig<N bit> signal bit.

19. The method of claim 15, wherein the respective Wab<N bit> signal bit drives the PMOS gate terminal of the selected CC system to a logic "low" turning the associated inverter power on and the unselected PMOS gate terminal to logic "high" disconnecting the respective inverter from the power supply.

20. The method of claim 15, wherein while the selected and powered-on inverters upon receiving rising transition through respective Wa_trig<N bit> signal bit, drive a falling signal to the selected coupling capacitors to create a negative bump, the unselected inverters are powered off by PMOS switches and with static "low" Wa_trig<N bit> input, drive high impedance to the unselected coupling capacitors.

* * * * *